United States Patent [19]

Gamelin

[11] Patent Number: 4,660,316
[45] Date of Patent: Apr. 28, 1987

[54] LIGHT SIGNALLING FISHING ACCESSORY

[76] Inventor: Bruce W. Gamelin, River St., Champlain, N.Y. 12919

[21] Appl. No.: 877,495

[22] Filed: Jun. 23, 1986

[51] Int. Cl.$^4$ .................... A01K 91/06; A01K 97/12
[52] U.S. Cl. ........................................................... 43/17
[58] Field of Search ............................................. 43/17

[56] References Cited

U.S. PATENT DOCUMENTS

| | | |
|---|---|---|
| 963,654 | 7/1910 | Schindler . |
| 1,815,662 | 5/1930 | Bacon ................................ 43/17 |
| 2,354,279 | 11/1942 | Ross ................................... 43/17 |
| 2,574,333 | 11/1951 | Kuczynski et al. .............. 43/17 |
| 2,587,223 | 2/1952 | Robinson ......................... 43/17 |
| 2,619,559 | 11/1952 | Schenkel ........................ 200/52 |
| 2,741,054 | 4/1956 | Brundage ......................... 43/17 |
| 3,024,561 | 3/1962 | Wyatt ............................... 43/17 |
| 3,148,473 | 9/1964 | Miller ............................... 43/17 |
| 3,711,847 | 1/1973 | Barrows ........................ 340/279 |
| 3,868,668 | 2/1975 | Woodbury .................... 43/17 X |
| 4,528,554 | 7/1985 | Klefbeck ....................... 43/17 X |

FOREIGN PATENT DOCUMENTS 861104 2/1961 United Kingdom ................. 43/17

*Primary Examiner*—Nicholas P. Godici
*Assistant Examiner*—Carmine Cuda
*Attorney, Agent, or Firm*—Heslin & Rothenberg

[57] ABSTRACT

A light signalling fishing accessory device includes a casing containing one or more electrical batteries therein and an electrical lamp connected to the batteries by means of an interrupted electrical circuit. Completion of the circuit is accomplished by a pivoting arm which moves a contact into and out of electrical contact with an electrical terminal within the casing. A clamp member on the arm engages a fishing line at one end of which is a fishing hook. A fish impaled on the hook and struggling causes a pull on the line in the clamp and consequently on the arm to which the clamp is attached. Pivoting of the arm moves a contact portion at one end thereof into an aperture in the casing and into contact with an electrical terminal in the casing, thus completing an electrical circuit between the batteries and the lamp and energizing the lamp as a light signal. The device includes a base with a threaded aperture therein and may be mounted on a threaded rod which is driven into the earth.

9 Claims, 4 Drawing Figures

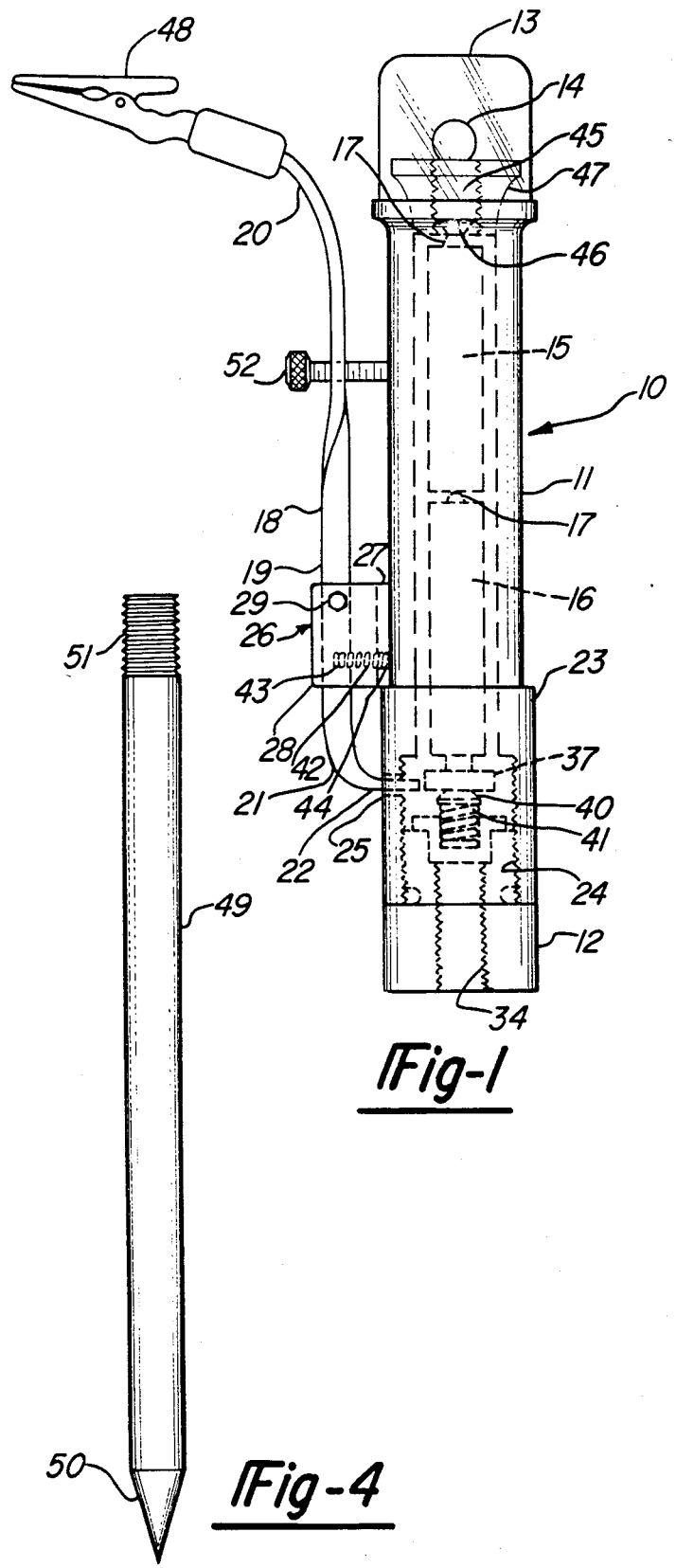
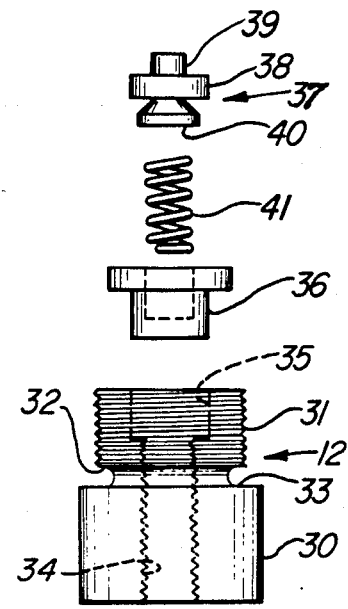
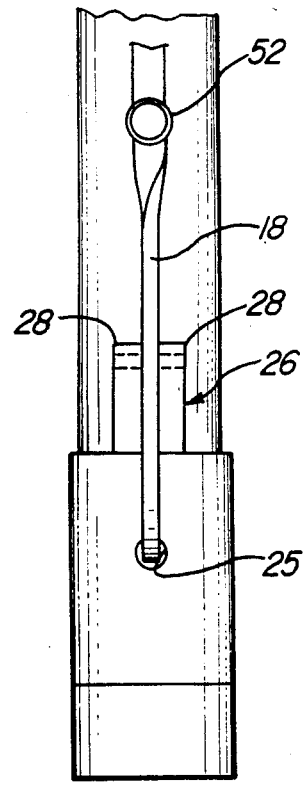

LIGHT SIGNALLING FISHING ACCESSORY

BACKGROUND OF THE INVENTION

1. Field of the Invention

This invention relates to a light signalling fishing accessory, and more particularly, to an improved light signalling device specifically adapted to be actuated by a fish which has become impaled on a hook to cause a light source to become energized and provide a visual warning or indication of an impending catch of a fish.

2. Prior Art

Fishing accessory devices which are activated by a fish becoming impaled on a hook attached to a line are known in the art. Examples of these known devices are disclosed and described in the following U.S. Pat. Nos. 4,528,554-Klefbeck-issued July 9, 1985 1,815,662-Bacon-issued July 21, 1931

Klefbeck discloses a small, battery operated light signaling device which is suspended from a fishing line between the fishing pole and the water. A pull on the fishing line causes a plug to be removed from a barrel permitting a contact member to close an electrical circuit from the battery to a small lamp and thus energize the lamp as a signal that the line has been pulled, for example, by a fish on a hook at the end of the line.

Bacon discloses a small, battery operated light signalling device which is mounted on a fishing pole with the fishing line attached to a pivoting arm on the device. A pull on the line moves the arm into engagement with an electrical contact connected to the battery with consequent closure of an electrical circuit to a small lamp which is then energized as a signal that the fishing line has been pulled assumedly by a fish which has been impaled on a hook on the line.

A significant number of the prior art devices are specifically adapted to be attached to well known fishing rods. These fishing rods generally comprise long thin highly flexible rods or reeds which are secured at one end in a cylindrical handle. Metallic eyelet guides are fastened along the rod to guide a fishing line along the rod and into a body of water. A line reeling mechanism is attached to the handle to reel in or pay out the line at the end of which a fish hook is attached. Recent advances in the art of fishing rods have accentuated the highly desirable features of reduced weight and predetermined flexibility.

OBJECTS OF THE INVENTION

It is an object of this invention to provide a light signalling device actuated by an increase in tension or pull on a fishing line, where the device may be located separately from a fishing rod.

It is another object of this invention to provide a light signalling fisherman's accessory device which is automatically resettable and self-actuating so that it does not require attachment to any other device for actuating purposes.

It is yet another object of this invention to provide an improved and reliable electrical circuit making and breaking mechanism for a fish activated light signalling device.

It is still another object of this invention to provide a fish activated light signalling device specially adapted to be post mounted above the earth and remote from a fisherman or a fishing rod.

SUMMARY OF THE INVENTION

A hollow cylindrical housing or casing includes therein one or more series arranged electrical batteries such as those known as flashlight or dry cell batteries. These batteries generally comprise a closed base metal cylinder containing the usual dry cell battery components with the metal cylinder usually serving as the electrically negative terminal of the battery. The electrically positive terminal is ordinarily a small metal cap on a thin rod which is concentrically positioned in the cylinder and projects a short distance from the open end. A disc of an electrically non-conductive material surrounds the rod at the open end of the cylinder to sealingly engage the rod as well as the open end of the metal cylinder to close off the battery components in the cylinder. These batteries are inserted in the casing of this invention one following another so that the projecting positive terminal of a following battery is in electrical contact with the electrically negative base of a preceding battery. At one end of the casing there is a transparent globe which encloses a small electrical lamp of the kind generally referred to as a flashlight lamp or bulb. This lamp has a screw in, closed end, cylindrical base. An electrically positive terminal projects a short distance from the closed end of the base and the lateral wall of the base serves as the electrical negative terminal for the lamp. The lamp is positioned on one end of the casing so that its base projects into the casing and its electrical positive terminal engages the electrical positive terminal of an adjacent battery in the casing, and an electrical positive circuit is established between the lamp and the battery. An electrical negative circuit is established between the battery casing and the casing which is electrically conductive, and from the casing to the lamp base negative terminal. This electrical negative circuit is normally interrupted between the battery casing and the housing, and completing this part of the circuit energizes the lamp. Completing the circuit is accomplished by an electrically conductive arm member which is pivotally attached to the casing. A fishing line is attached to the arm member and a pull on the line pivots the arm member causing a part thereof to engage an electrical negative terminal button in the casing and in electrical contact with a battery casing therein. This arm engagement completes the electrical negative circuit from the battery casing to the arm member, into the casing and then to the negative part of the lamp base to energize the lamp. The arm member is spring biased out of engagement with the electrical negative terminal button and therefore resets itself to that position when there is no pull on the line.

Batteries are inserted into the hollow cylindrical casing by removing a large screw in plug closure member at one end of the casing. The plug closure member is concentrically drilled and tapped to accommodate a threaded stake rod which is securely driven into the earth to support the light signalling device vertically in a desired remote location.

The above and other objects and advantages of this invention will be better understood when taken in connection with the following description and drawings.

BRIEF DESCRIPTION OF THE DRAWINGS

FIG. 1 is a side elevational and partial cross-sectional view of a preferred form of this invention.

FIG. 2 is a front elevational view of the structure of FIG. 1.

FIG. 3 is a side elevational and exploded view of the plug closure member of FIG. 1.

FIG. 4 is an elevational view of a stake rod useful in the invention.

DESCRIPTION OF A PREFERRED EMBODIMENT

Referring now to FIG. 1, the light signalling device 10 comprises a hollow, generally cylindrical housing or casing 11 which is closed at one end by a threaded plug closure member 12. At the other end of casing 11 there is a transparent globe or lens 13 which encloses an electric lamp 14 in the end of housing 11 which is enclosed by globe 13.

Disposed within hollow casing 11 are one or more electrical energy cells 15 and 16 which are generally referred to as dry cell electrical batteries. These batteries are cylindrical and have a concentric button type of electrical terminal 17 projecting from an end face thereof which is the electrical positive terminal of the battery. As illustrated in FIG. 1, in one form of this invention, a pair of batteries 15 and 16 are inserted concentrically into casing 11 one behind the other so that the button terminal 17 of the following battery 16 contacts the base of the preceding battery 15.

In the usual construction of batteries of the kind noted, an electrically conductive metal cylinder with a closed base end is utilized to contain the battery components and the cylinder and its usually exposed base is the negative electrode of the battery. The making and breaking of an electrical circuit from the batteries 15 and 16 to the lamp 14 by a pull on a fishing line is accomplished by means of switch arm 18 and appropriate electrical contacts. Switch arm 18 comprises a reverse curvature arm having a straight section 19 intermediate a pair of reverse curved sections 20 and 21. At each end of straight section 19 there is a 90 degree curvature of arm 18, each curvature being a 180 degree reversal of the other. The first curvature 20 curves away from casing 11 while the opposite curvature 21 terminates in a finger contact 22 which projects towards casing 11.

A sleeve 23 is fitted on the end of casing 11 opposite from lamp 14. Sleeve 23 serves as an extension of casing 11 and has an inside diameter slightly larger than the inside diameter of casing 11. The internal wall of sleeve 23 is threaded to provide a threaded bore of chamber 24 which is concentric with casing 11 and the batteries 15 and 16 therein. Sleeve 23 is also provided with a lateral aperture 25 which opens into the bore 24 of sleeve 23. Lateral aperture 25 is adapted to receive finger contact 22 of arm 18 therein. Arm 18 is pivotally supported on casing 11 by means of pivot support 26 which is attached thereto. As illustrated in FIG. 2, a pivot support 26 is a U-section support having a rectangular base 27 and a pair of spaced rectangular arms 28 extending transversely therefrom in parallel spaced relationship. Arm 18 is positioned along casing 11 with its straight section 19 residing between arms 28 of pivot support 26 as shown in FIG. 2.

A pivot pin or bolt 29 passes laterally through arms 28 and straight section 19 to pivotally support arm 18 on support 26 in spaced relationship to casing 11, the longitudinal axis of arm section 19 being parallel to the longitudinal axis of the cylindrical casing 11. The arm 18 is caused to pivot or rotate about the pin 29, and this pivoting or hinge action is utilized to cause the finger contact 22 of arm 18 to withdraw from or project further into aperture 25. Aperture 25 extends laterally through the wall of sleeve 23 and opens into threaded bore 24. Threaded bore 24 which is concentric with hollow casing 11 and is, in one sense, an extension thereof, is adapted to be closed off by a special screw-in plug closure 12 which also incorporates certain components of the electrical circuits in the device of this invention.

Referring now to FIG. 3, the plug closure member 12 comprises a relatively massive cylindrical section 30 with a stepped down section 31 extending therefrom and concentric therewith. The stepped down section 31 is separated from section 30 by an undercut groove 32 which defines a shoulder 33 on section 30. The stepped down section 31 of plug closure 12 is provided with mating screw threads to those of threaded bore 24 of sleeve 23. Plug section 31 is threaded into bore 24 until shoulder 33 of plug section 30 abuts the end of sleeve 23 to effectively close off casing 11 and the batteries 15 and 16 therein.

As illustrated in FIG. 3, plug closure member 12 also includes a central and concentric threaded bore aperture 34 passing through both the cylindrical section 30 as well as the stepped down section 31. The end of bore 34 in section 31 includes an enlarged section or counterbore 35. Seated within counterbore 35 is an electrically insulating cup bushing 36 (shown in exploded view in FIG. 3) and in its functional position in FIG. 1.

Referring again to FIG. 3, there is illustrated an electrical button terminal 37 which comprises a central disc section 38 and a pair of small projections 39 and 40 protruding oppositely from each disc face. Projection 40 is adapted to be received in the cavity of cup bushing 36. However, biasing means in the form of a small coil spring 41 also resides in cup bushing 36 and urges projection 40, and terminal 37, in a direction out of cup bushing 36. The threading of closure member 12 into sleeve 23 causes projection 39 of terminal button 37 to engage the base of battery 16 for electrical contact therewith, and further threading of closure 12 into sleeve 23 permits terminal projection 40 to fit further into cup bushing 36 and further compress spring 41 so that terminal 37 is continually and positively biased into engagement with battery 16 as shown in FIG. 1.

If the arm 18 of FIG. 1 is pivoted about pivot 29 in a clockwise direction, finger contact 22 of arm 18 is withdrawn from aperture 25 in sleeve 23. If arm 18 is pivoted in a counterclockwise direction, finger contact 22 is caused to project further into aperture 25 until it comes into contact with terminal 37. At this point the electrical negative side of an electrical circuit is established from the casing of battery 16 through arm 18 and pivot 29 to the casing 11 which, in one example, is electrically conductive or contains electrically conductive components leading to lamp 14. Lamp 14 is threaded into casing 11 and the side of its cylindrical base is in electrical contact with housing 11 to complete a negative circuit from the batteries to the lamp and energize lamp 14, while the positive electrical terminal in the lamp base is in direct contact with the positive terminal of battery 15 and maintained in such contact by the biasing spring 41.

In order to retain the electrical negative circuit in an inactive state when it is not to be used, arm member 19 is continually biased in a clockwise direction so that finger contact 22 of arm 18 does not contact terminal 37. This biasing means is provided by a small cylindrical coil spring 42 which is contained in opposite cavities 43 and 44 in arm 18 and pivot base 27, respectively. Spring 42 tends to rotate arm 18 in a clockwise direction about pivot 28 so that contact finger 22 is moved away from contact with terminal 37 to open the negative electrical circuit as described, between battery 16 and casing 11, and lamp 14.

In general the electrical circuit for energization of lamp 14 is provided by the selection and arrangement of the parts of casing 11. As previously described, casing 11 includes therein one or more conventional cell batteries 15 and 16, sometimes referred to as flashlight batteries, which are provided with a central button terminal, and the usual metal case and base is the electrical negative terminal. Lamp 14 is of the well known flashlight lamp or bulb with a screw-in cylindrical base 45 the bottom of which includes a projecting positive terminal 46 for the lamp filament, the side of base 45 being the negative terminal for the lamp filament. Lamp 14 is fixed to one end of casing 11 so that it extends into the casing with its positive electrode 46 engaging a positive electrode 17 of battery 15 in casing 11. An electrical circuit from a positive terminal of a battery to the positive terminal of the lamp is accordingly established. In the present invention, the negative circuit from the batteries to the lamp is normally incomplete or interrupted and must be completed in order to energize the lamp.

Lamp 14 is threaded into an electrically conductive support structure 47 which is joined to casing 11. Therefore the side wall of lamp base 45 which is the negative terminal of lamp 14 is in contact with support structure 47 and also casing 11. Lamp 14 is energized by completing an electrical circuit between a battery casing and the casing 11 by means of pivoting arm 18, and arm 18 is attached to a fishing line so that a pull on the line will pivot the arm and complete the described circuit.

The curved section 20 of arm 18 is fitted with an appropriate line attaching means such as a clamp or clip 48. The usual fishing line, between the fishing rod and fish hook at the end of the line in the water, is engaged by the clip 48. When a fish is ensnared on the hook on the end of the line and attempts to swim away, there will be a pull on the line which is engaged by clamp 48. If the pull on the line, or the increased tension, is sufficient to pull arm 18 away from casing 11 and rotate arm 18 counterclockwise about pivot 28, as well as overcome the bias of spring 42, the finger contact 22 of arm 18 will be caused to project further into casing 11 through aperture 25 and engage terminal 37 to complete the electrical circuit as described between the casing of battery 16 and casing 11 and energize lamp 14 as a signal to the fishing attendant that a fish is probably hooked and is pulling on the line. Lamp 14 may be manufactured with a color tinted glass, or the globe 13 may be color tinted so that a color signal may be given to the fishing attendant.

It is a feature of this invention that the light signal energizing circuit automatically resets to its open circuit condition any time that the pull on arm 18 or clamp 48 does not overcome the bias of spring 42. The circuit of this device, therefore, does not require a separate reset arrangement and effort each time the circuit is energized. It is also a feature of this invention that the electrically negative side of the circuit is established or broken to energize or cease energization of lamp 14. This provides an increase in sensitivity of finger contact 22 with terminal 37. The positive circuit directly from the battery 15 to the base of lamp 14 remains completed at all times. In some instances it is highly desirable that the fishing rod be firmly fixed to the earth as indeed it has happened that a struggling larger fish has dragged a fishing pole from the shore at water's edge into the water. Also there may not be any consequent natural structure to which a fishing pole may be affixed. In both instances a light signalling warning means is desirable.

The device of this invention is also adapted to provide a satisfactory solution to these problems. As illustrated in FIG. 3, the plug closure 12 includes a rather massive cylindrical section 30. Section 30 includes a concentric aperture 34 passing therethrough which is threaded throughout the length of plug sections 30 and 31.

Referring now to FIG. 4, there is shown a support rod 49. Rod 49 may be a steel rod of small diameter, for example 0.0375 inch. One end of rod 49 terminates in a sharpened point 50 while the other end 51 is threaded with a mating thread to the thread of aperture 34 in section 30 of closure 12 of FIG. 3. Rod 49 may be driven securely into the shore at a water's edge or away from the shore in a convenient location. Thereafter the assembled device of this invention is threaded on the threaded portion of rod 49 by inserting the threaded part of rod 49 into the aperture 34 of closure 12. The combination of the relatively large screw in plug 12 and rigid support rod 49 provides a firm anchor for the fishing line, and with a safety loop of the line around the driven rod 49, makes highly unlikely that a fish could swim away with the line with sufficient force to loosen and topple the rod 49.

By selecting a spring 42 of a described compressive force the sensitivity of this invention may be increased or decreased, for example, decreased so that small waves, ripples or other minor water disturbance will not activate the lamp 14. At the same time a decrease in sensitivity may indicate that if lamp 14 is energized there is or has been, a significant pull on the fishing line.

Additional adjustment means for sensitivity is also provided in this invention by means of thumb screw 52. Screw 52 passes through and is threaded into arm 18 at a point between the pivot pin 29 and the clip 48 on arm 18. Turning screw 52 further into arm 18 increases the length of the screw between the casing 11 and the arm 18 compressing spring 44 and positioning contact finger 22 closer to electrical terminal 37.

While a preferred embodiment of this invention has been illustrated and described, it will be obvious to those skilled in the art that various changes and modifications may be made therein without departing from the scope of the invention as defined by the appended claims.

What is claimed is:

1. A light signalling fishing accessory device comprising in combination
    (a) a hollow cylindrical casing,
    (b) one or more electrical batteries in said casing,
    (c) a plug closure member threadedly engaged in one end of said hollow casing to contain said batteries therein,
    (d) an electrical lamp on said casing and electrically connected to said batteries by an interrupted electrical circuit,
    (e) an electrically conductive arm member pivotally attached to said casing, said arm member extending substantially parallel to the logitudinal axis of said casing, (f) said arm member having a curved section at one end curving away from said casing and a finger contact on the other end of said arm member, said arm member being attached at a location intermediate said ends to a pivot, (g) fishing line connecting means attached to said curved end and adapted to secure a fishing line, (h) said casing having an aperture in its side wall adjacent said finger contact of said arm member so that upon rotation of said arm member about said pivot said finger contact projects into said aperture and into said casing, (i) an electrical terminal in said casing biased into electrical contact with one of said batteries and adjacent said aperture so that a predetermined rotation of said arm member about said pivot causes said finger contact to enter the aperture in said casing and contact the said electrical terminal therein to complete said interrupted circuit and energize said lamp as a light signal.

2. The invention as recited in claim 1 comprising the further combination of a rod support for said device, said rod support comprising in combination (a) a straight and rigid rod having a sharpened point at one end and adapted to be driven securely into the earth, (b) said rod having a threaded section at the other end thereof, (c) the said plug closure for said casing having a concentric threaded aperture therethrough with a mating thread to the said threaded section on said rod, (d) said plug being threaded on said rod so that said casing is supported on top said rod.

3. The invention as recited in claim 1 wherein the curved section of said arm member which curves away from said casing is fitted with a clamp member adapted to tightly engage a fishing line.

4. The invention as recited in claim 1 wherein said electrical terminal is within said housing and spring biasing means is positioned on said plug closure to bias said terminal into electrical engagement with the metallic base of an adjacent battery.

5. The invention as recited in claim 1 wherein the finger contact comprises the terminal portion of a reverse curved section at the other end of said arm member, said reverse curved section curving in towards said casing; and wherein said arm member includes an intermediate straight section between said ends, said intermediate section extending alongside said casing.

6. The invention as recited in claim 1 wherein biasing means is provided on one side of said pivot and between said arm member and said casing to bias said arm member and said finger contact away from said electrical terminal.

7. The invention as recited in claim 6 wherein adjusting means in said arm member is operable to adjust the said biasing means.

8. The invention as recited in claim 7 wherein said adjusting means comprises a screw member which passes through a threaded aperture in said arm member at a position on the opposite side of said pivot from said biasing means so that turning said screw means into engagement with said casing rotates said arm member about said pivot and moves said finger contact closer to said electrical terminal.

9. The invention as recited in claim 8 wherein said finger contact engages said electrical terminal to complete an electrical circuit from the terminal to the arm member and into the casing and lamp for energization thereof.

* * * * *